United States Patent [19]

Willis

[11] 4,377,775
[45] Mar. 22, 1983

[54] TELEVISION RECEIVER FERRORESONANT POWER SUPPLY DISABLING CIRCUIT

[75] Inventor: Donald H. Willis, Indianapolis, Ind.

[73] Assignee: RCA Corporation, New York, N.Y.

[21] Appl. No.: 287,968

[22] Filed: Jul. 29, 1981

[51] Int. Cl.³ .............................................. H01J 29/70
[52] U.S. Cl. ...................................... 315/411; 358/243
[58] Field of Search .................. 315/411; 358/190, 243

[56] References Cited

U.S. PATENT DOCUMENTS

| | | | |
|---|---|---|---|
| 3,885,201 | 5/1975 | Fernsler | 315/411 |
| 4,058,754 | 11/1977 | Ohnishi et al. | 358/90 |
| 4,319,167 | 3/1982 | Wendt | 315/411 |

*Primary Examiner*—Theodore M. Blum
*Attorney, Agent, or Firm*—E. M. Whitacre; P. J. Rasmussen; Joseph Laks

[57] ABSTRACT

A television display system includes a ferroresonant power supply with a protection circuit for disabling normal operation of a load circuit within the television display system during a fault operating condition. An exciting current is developed from a source of alternating input voltage, controllable in frequency of operation. In response to the exciting current, a magnetic flux is generated in the magnetizable core of a saturable reactor to link a winding located on the core for developing an alternating polarity output voltage. A capacitance associated with the winding generates another magnetic flux in the magnetizable core that in conjunction with the first magnetic flux magnetically saturates a saturable core section during each cycle of the alternating polarity output voltage for regulating the output voltage by ferroresonant operation. A load circuit within the television display system is energized by the regulated alternating polarity output voltage. A fault operating condition within the television display system is detected to activate a control circuit that changes the frequency of operation of the source of alternating input voltage to a frequency that results in the disruption of normal ferroresonant power supply operation and of normal operation of the television display system load circuit.

23 Claims, 1 Drawing Figure

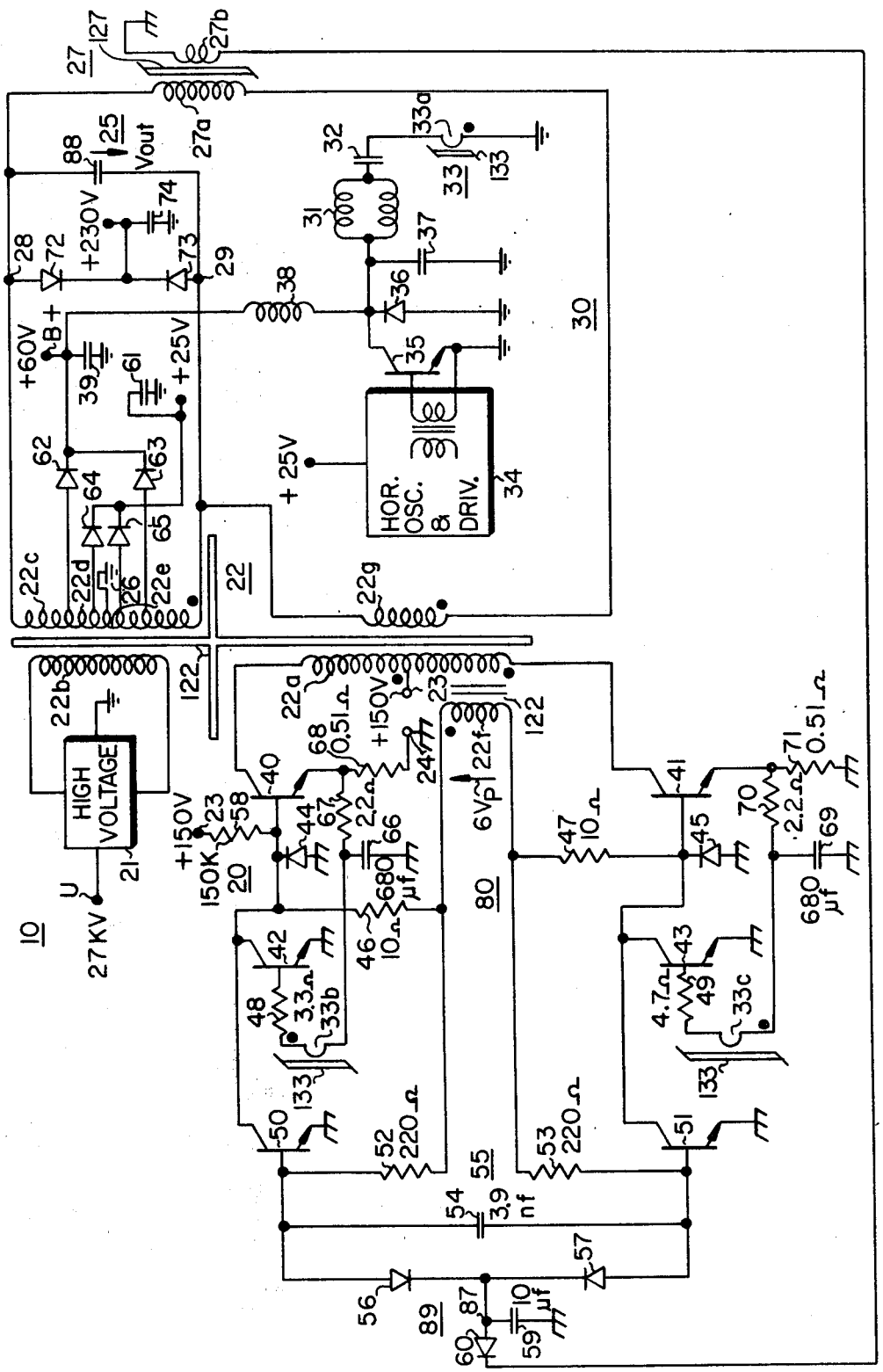

TELEVISION RECEIVER FERRORESONANT POWER SUPPLY DISABLING CIRCUIT

This invention relates to television receiver ferroresonant power supply disabling circuits.

A ferroresonant power supply may be used to provide a regulated ultor voltage and a regulated B+ scanning voltage for a television receiver. When operated at a relatively high input frequency such as the horizontal deflection frequency of about 16 KHz, a ferroresonant power supply is a relatively compact and low weight unit that provides inherent output voltage regulation without the need for a relatively complex and expensive electronic regulator control circuit.

In the U.S. patent applications of D. H. Willis, Ser. No. 220,847, filed Dec. 29, 1980, entitled "TELEVISION RECEIVER FERRORESONANT LOAD POWER SUPPLY", and Ser. No. 255,396, filed Apr. 20, 1981, entitled "TELEVISION RECEIVER FERRORESONANT LOAD POWER SUPPLY WITH REDUCED SATURABLE REACTOR CIRCULATING CURRENT", both herein incorporated by reference, a ferroresonant power supply is described wherein a source of unregulated alternating polarity voltage is coupled to the primary winding of a high leakage power transformer. A ferroresonant saturable reactor load circuit is coupled across a secondary output winding of the high leakage transformer. A plurality of other secondary output windings, including a high voltage output winding, are magnetically tightly coupled to the first mentioned secondary output winding.

Various television receiver DC voltages are derived from the alternating polarity voltage developed across the transformer secondary windings, including a DC ultor voltage derived from the voltage developed across the high voltage winding and a B+ scanning voltage derived from the voltage developed across a low voltage secondary output winding. The ferroresonant load circuit regulates the voltage developed across one of the transformer secondary output windings, thereby regulating the voltages developed across all of the other secondary output windings.

The ferroresonant load circuit comprises a capacitor coupled across the high leakage transformer secondary output winding and a saturable reactor. During each half cycle of the alternating polarity output voltage, the core of the saturable reactor magnetically saturates to develop a circulating current between the capacitor and a winding of the saturable reactor, thereby regulating the alternating polarity output voltage by ferroresonant operation. In the second of the aforementioned Willis U.S. patent applications, an additional winding of the high leakage transformer, magnetically tightly coupled to the transformer primary winding, is conductively coupled in series with the ferroresonant saturable reactor winding across the capacitor. Such an arrangement enables the ferroresonant load circuit to provide relatively good output voltage regulation at reduced circulating current levels.

Under a fault operating condition within the television receiver or television display system, it may be desirable to disable normal television receiver operation by disabling the normal output voltages being produced by the ferroresonant power supply. The fault operating condition may be occurring within the ferroresonant power supply or within other load circuits of the television receiver such as the television receiver picture tube. If the aforedescribed ferroresonant load circuit power supply is used, a fault operating condition may arise within the ferroresonant load circuit that produces an increase in the amplitudes of the output voltages.

A feature of the invention is the incorporation within the ferroresonant power supply of a protection circuit that disables normal operation of a load circuit within the television display system during a fault operating condition. A source of alternating input voltage, controllable in frequency of operation, is coupled to a circuit that develops an exciting current to generate a magnetic flux in a magnetizable core that links a winding located on the core so as to develop an alternating polarity output voltage. A capacitance associated with the winding generates another magnetic flux in the core that in conjunction with the first magnetic flux magnetically saturates a saturable section of the core during each cycle of the alternating polarity output voltage for regulating the output voltage by ferroresonant operation. A load circuit within the television display system is energized by the regulated alternating polarity output voltage. A fault operating condition within the television display system is detected and activates a control circuit that changes the frequency of operation of the source of alternating input voltage to one that results in the disruption of the operation of the ferroresonant power supply in order to disable normal operation of the television display system load circuit.

The FIGURE illustrates a television receiver deflection circuit and ferroresonant power supply incorporating a protection circuit embodying the invention.

In the FIGURE, a primary winding 22a of a high leakage inductance transformer 22 is coupled to a source 20 of unregulated alternating input voltage, controllable in frequency of operation. Controllable source 20 comprises a source of unregulated DC input voltage developed across terminals 23 and 24 and a controllable oscillator 80 having output switching transistors 40 and 41 coupled to primary winding 22a. Output transistors 40 and 41 are arranged with primary winding 22a in a push-pull inverter arrangement, with the center tap of winding 22a coupled to the DC input terminal 23 and with the emitters of transistors 40 and 41 coupled to earth ground terminal 24 through resistors 68 and 71, respectively.

When the alternating input voltage is applied to primary winding 22a by controllable oscillator 80, alternating polarity output voltages are developed across secondary output windings 22b–22e. A common center tap lead of windings 22c–22e is coupled to a chassis ground 26 conductively isolated from earth ground 24.

The alternating polarity output voltage developed across winding 22c is full wave rectified by diodes 72 and 73 and filtered by a capacitor 74 to develop a DC supply voltage, of illustratively +230 volts, to power such circuits as the television receiver picture tube driver circuits. The alternating polarity output voltage developed across winding 22e is full-wave rectified by diodes 64 and filtered by a capacitor 61 to develop a DC supply voltage, of illustratively +25 volts, to power such television receiver circuits as the vertical deflection circuit, the audio circuit, and the chroma-luma circuits.

The alternating polarity output voltage developed across winding 22d is full-wave rectified by diodes 62 and 63 and filtered by a capacitor 39 to develop, at a B+ terminal, a B+ scan supply voltage to energize a horizontal deflection generator 30 for developing horizontal scanning current in a horizontal deflection winding 31. Horizontal deflection generator 30 is coupled to the B+ terminal through an inductor 38 and comprises a horizontal oscillator and driver 34 energized by the +25 V supply, a horizontal output transistor 35, a damper diode 36, a retrace capacitor 37, and the series arrangement of horizontal deflection winding 31, an S-shaping or trace capacitor 32, and a winding 33a. Winding 33a is part of a saturable pulse transformer 33 that provides synchronizing pulses that establish the frequency of operation of controllable oscillator 80 at the horizontal deflection frequency and that synchronizes oscillator operation with the horizontal deflection or scanning current, as will be latter described.

The alternating polarity output voltage developed across a high voltage winding, output winding 22b, is coupled to a high voltage circuit 21 to develip a DC ultor voltage or accelerating potential at a terminal U for the television receiver picture tube, not illustrated. High voltage circuit 21 may comprise a conventional voltage multiplier circuit of the Cockroft-Walton type, or may comprise a half-wave rectifier arrangement with a plurality of diodes integrally molded as a single unit with a plurality of winding sections of winding 22b, the sections not being individually illustrated.

The output voltage Vout across secondary output winding 22c, between terminals 28 and 29, is regulated by the ferroresonant operation of a ferroresonant load circuit 25. Ferroresonant load circuit 25 comprises a saturable reactor 27 including a magnetizable core 127 and a winding 27a located thereon, a capacitor 88 coupled between terminals 28 and 29 and a winding 22g of transformer 22 magnetically tightly coupled to winding 22a and coupled in series with saturable reactor winding 27a across capacitor 88.

By being coupled to transformer secondary output winding 22c, ferroresonant load circuit 25 acts as a regulating load circuit to maintain the voltage across winding 22c as the regulated voltage Vout. With the voltage across secondary output winding 22c regulated by the ferroresonant operation of ferroresonant load circuit 25, the output voltages across all the other secondary windings that are tightly coupled to winding 22c including high voltage winding 22b, are also regulated. Because of the loose magnetic coupling between primary winding 22a and the secondary windings 22b–22e, the voltage across these secondary windings can remain relatively unchanged in amplitude or half-cycle area, even though the voltage across the primary winding varies in amplitude.

Transformer 22, in combination with capacitor 88, develops an exciting current in saturable reactor winding 27a for generating a combined magnetic flux in core 127 that links winding 27a to produce the alternating polarity output voltage Vout. To regulate Vout by ferroresonant operation, capacitor 88 generates a circulating current during each half cycle of the alternating polarity output voltage that aids in magnetically saturating the core section of magnetizable core 127 that is associated with the reactor winding.

As the saturable core section goes into saturation and comes out of saturation, the inductance exhibited by saturable reactor winding 27a switches between a low impedance state and a high impedance state. Under control of this switching action, which is a function of the saturation characteristics of the magnetizable material of core 127, the amplitude of the output voltage, the half cycle area of the output voltage, or both the amplitude and half cycle area are regulated against changes in the amplitude of the DC input voltage developed across terminals 23 and 24 and against changes in the loading on the various DC supply terminals including the ultor supply terminal U.

Controllable oscillator 80 comprises output switching transistors 40 and 41, diodes 44 and 45, each paralleling a respective base-emitter current path of the output switching transistors, and a feedback winding 22f of transformer 22 coupled to the bases of transistors 40 and 41, respectively, through resistors 46 and 47.

In the absence of horizontal rate synchronizing control pulses, positive feedback provided by winding 22f produces a free-running operation of controllable oscillator 80 at a frequency between 5 and 10 kilohertz, a frequency lower than the horizontal deflection frequency, as described in the U.S. patent application of D. W. Luz et al., Ser. No. 174,943, filed Aug. 4, 1980, entitled "TELEVISION RECEIVER, PUSH-PULL INVERTER, FERRORESONANT TRANSFORMER POWER SUPPLY SYNCHRONIZED WITH HORIZONTAL DEFLECTION", herein incorporated by reference. A start-up resistor 58 is coupled between DC input terminal 23 and the base of output transistor 40 to begin the switching action of the controllable oscillator when the television receiver is turned on.

To control the frequency of operation of oscillator 80 at the horizontal deflection frequency, and to synchronize oscillator operation with horizontal deflection, the control circuitry of the oscillator includes turn-off control transistors 42 and 43 respectively coupled to the bases of output transistors 40 and 41, and saturable pulse transformer 33 having secondary windings 33b and 33c respectively coupled to the bases of turn-off control transistors 42 and 43 through respective resistors 48 and 49.

As described in the aforementioned Luz et al. U.S. patent application, the horizontal deflection current flowing through the primary winding 33a of pulse transformer 33 maintains core 133 of the pulse transformer in magnetic saturation during each deflection cycle, except during those intervals near the zero-crossover instants of the deflection current when core 133 comes out of saturation to produce output pulse voltages across secondary windings 33b and 33c. Near the zero-crossover instant within the trace interval of each deflection cycle, a positive voltage pulse is produced at the dotted terminal of winding 33b and is applied to control transistor 42 to turn the transistor on, thereby turning off output switch transistor 40. Near the zero-crossover instant during the retrace interval of each deflection cycle, a positive pulse is produced at the undotted terminal of winding 33c and is applied to control transistor 43 to turn on the transistor, thereby turning off output switching transistor 41.

As described in the concurrently filed U.S. patent application of D. W. Luz, Ser. No. 288,237, entitled "DUTY-CYCLE CONTROLLED INVERTER POWER SUPPLY FOR A TELEVISION RECEIVER", herein incorporated by reference, a DC feedback voltage, representative of the current flowing in the collector path of output switching transistor 40, is developed across a capacitor 66 by way of resistors 67 and 68. This current representative feedback voltage is applied to pulse transformer secondary winding 33b to provide voltage biasing of the base of transistor 42 to obtain a substantially 50 percent duty cycle switching of output transistor 40 under varying collector current levels. A similar DC feedback voltage to control the duty cycle switching of output transistor 41 is developed across a capacitor 69 by way of resistors 70 and 71.

An auxiliary oscillator control circuit 55, normally inactive, is coupled to the bases of output switching transistors 40 and 41 to control the frequency of operation of oscillator 80 when the auxiliary control circuit is activated. Auxiliary control circuit 55 comprises auxiliary turn-off control transistors 50 and 51 having collector terminals coupled to respective output switching transistors 40 and 41 and a reactive network comprising a capacitor 54 coupled between the bases of transistors 50 and 51 and resistors 52 and 53 coupled in a balanced arrangement to feedback winding 22f of transformer 22.

A disabling or deactivating circuit 89 for auxiliary oscillator circuit 55 comprises diodes 56 and 57 coupled in a series arrangement across the bases of transistors 50 and 51, with the cathodes of diodes 56 and 57 being coupled to a common junction terminal 87. A filter capacitor 59 is coupled between terminal 87 and earth ground. A diode 60 has its anode coupled to terminal 87 and its cathode coupled to a winding 27b that is magnetically coupled to winding 27a of ferroresonant saturable reactor 27.

Under normal television receiver operating conditions, a negative DC voltage is developed at terminal 87. The voltage at the base of transistor 50 or transistor 51 cannot become sufficiently positive to turn on the respective transistor. The current flowing from feedback winding 22f through resistor 52 or 53 will be diverted away from the respective transistor base to flow through diode 56 or diode 57. Under normal operating conditions, therefore, auxiliary oscillator control circuit 55 is maintained inactive.

To activate auxiliary oscillator control circuit 55, the negative voltage at terminal 78 is removed, blocking low impedance conduction through diodes 56 and 57. Assume that the dotted terminal of feedback winding 22f is positive relative to the undotted terminal when the negative voltage at terminal 87 is removed. With the dotted terminal of winding 22f positive, base current is flowing in output switching transistor 40 through resistor 46 to maintain the transistor in saturated conduction. Current also flows from the dotted terminal of winding 22f through resistor 52, capacitor 54, resistor 53 to the undotted terminal of winding 22f. When the upper electrode of capacitor 54 becomes sufficiently positive relative to the lower electrode, to bring the voltage at the base of transistor 50 more than 1 $V_{be}$ above earth ground, turn-off control transistor 50 becomes conductive, shunting base current away from output switching transistor 40, thereby turning the output transistor off.

When collector current in output transistor 40 ceases, the voltage across feedback winding 22f reverses polarity with the undotted terminal becoming positive, thereby turning on output switching transistor 41. Current from the undotted terminal of winding 22f flows through resistor 53 to the lower electrode of capacitor 54, discharging the capacitor and then recharging the capacitor to an opposite polarity voltage. When capacitor 54 becomes sufficiently positive at its lower electrode to bring the voltage at the base of transistor 51 more than 1 $V_{be}$ above earth ground, turn-off control transistor 51 becomes conductive. With transistor 51 conductive, base current is shunted away from otuput switching transistor 41 turning the output switching transistor off. When collector current in output switching transistor 41 ceases, the voltage across feedback winding 22f reverses polarity, to begin another cycle of oscillator operation.

The frequency of oscillator operation is determined by the RC time constant associated with the reactive network of capacitor 54 and resistors 52 and 53. The RC time constant of the reactive network of auxiliary oscillator control circuit 55 may be chosen so that the frequency of operation of controllable oscillator 80 is changed from the normal synchronized oscillator frequency of the horizontal deflection frequency of around 16 KHz to a substantially higher frequency of operation, such as 100 KHz, for example. When controllable oscillator 80 is operated at the higher frequency of 100 KHz, a frequency that is too high to sustain ferroresonant operation, normal ferroresonant operation of ferroresonant load circuit 25 is disrupted, producing a substantial decrease in the amplitude of the output voltage Vout, to an amplitude that is 10 percent or less of normal. Normal operation of ferroresonant power supply 10 and the load circuits within the television receiver that are energized by the ferroresonant power supply, such as high voltage circuit 21 and horizontal deflection generator 30, is disabled.

One fault operating condition under which it may be desirable to activate auxiliary oscillator control circuit 55 is a fault condition wherein saturable reactor winding 27a becomes disconnected from secondary output winding 22c or becomes internally disconnected or open-circuited. With reactor winding 27a disconnected, the output voltage Vout tends to increase substantially. The voltage Vout increases because the high leakage transformer 22 is no longer being loaded down by the ferroresonant load circuit 25. Also, should capacitor 88 at the same time become disconnected from terminal 28 or 29, the voltage Vout may increase.

Saturable reactor winding 27b, magnetically coupled to saturable reactor winding 27a, acts as a detector of such a fault operating condition. Under normal operating conditions, with reactor winding 27a operatively in-circuit with the rest of ferroresonant load circuit 25, the AC voltage developed across reactor winding 27a produces an AC voltage across reactor winding 27b. The voltage across reactor winding 27b is rectified by diode 60 during the negative intervals and filtered by capacitor 59 to produce the negative voltage at terminal 87 that maintains auxiliary oscillator control circuit 55 inactive or disabled.

Under a fault operating condition, wherein reactor winding 27a becomes disconnected from terminals 28 or 29, for example, the voltages across windings 27a and 27b are removed. The absence of voltage being induced across winding 27b is a signal indicative of faulty power supply operation. The negative voltage normally developed at terminal 87 disappears, and diodes 56 and 57 become blocked, enabling auxiliary control circuit 55 to become activated. Once activated, control circuit 55 changes the frequency of operation of oscillator 80 to approximately 100 KHz. At the 100 KHz frequency of operation, a frequency of operation much higher than normal, the output voltages across all the secondary output windings 22b–22e of transformer 22 decrease substantially to 10 percent or less of normal. The reason that the output voltages decrease substantially when controllable oscillator 80 is operated at 100 KHz is that high leakage transformer 22 cannot supply enough power at high frequency to the loads to maintain proper output voltages. The television receiver load circuits that are energized by the output voltages developed across secondary output windings of transformer 22 are disabled because of the substantially lower than normal output voltages being developed when the auxiliary oscillator control circuit is activated under a fault condition.

Immediately after the television receiver is turned on, auxiliary oscillator control circuit 55 is activated because no voltage is present at terminal 87. Controllable oscillator 80 begins to operate at a frequency of around 100 KHz, producing a 100 KHz square-wave voltage across primary winding 22a of transformer 22. By transformer action, a 100 KHz square-wave voltage is produced across tightly coupled winding 22g and applied to saturable reactor winding 27a to produce an AC voltage across reactor winding 22b. This AC voltage is recitified by diode 60 and filtered by capacitor 59 to produce a negative voltage at terminal 87 that deactivates auxiliary oscillator control circuit 55.

After deactivation, controllable oscillator 80 becomes free-running at the 5 to 10 KHz frequency of operation provided by the positive feedback from winding 22f of transformer 22 to produce sufficient output voltage across secondary windings 22d and 22e to energize horizontal deflection generator 30. With horizontal deflection generator 30 energized, and with scanning current flowing in horizontal deflection winding 31, synchronizing control pulses are produced by pulse transformer 33 to trigger controllable oscillator 80 into operating at the steady state operating frequency of around 16 KHz.

What is claimed is:

1. A television display system that includes a ferroresonant power supply with a protection circuit for disabling normal operation of a load circuit within said television display system during a fault operating condition, comprising:
   a source of alternating input voltage;
   a magnetizable core including a saturable core section;
   means coupled to said source for developing an exciting current that generates a magnetic flux in said magnetizable core that links said winding to produce an alternating polarity output voltage;
   a capacitance associated with said winding for aiding in the magnetic saturation of said saturable core section during each cycle of said alternating polarity output voltage to regulate said output voltage by ferroresonant operation;
   a load circuit within said television display system that is energized by said regulated alternating polarity output voltage;
   means for detecting a fault operating condition within said television display system; and
   means coupled to said detecting means and to said source of alternating input voltage and responsive to the detection of a fault operating condition for changing the operation of said source of alternating input voltage to one that results in said ferroresonant power supply being operated in a mode that is incapable of sustaining ferroresonance in order to disable operation of said television display system load circuit.

2. A system according to claim 1 wherein said exciting current developing means comprises a transformer having first, second and third windings, said second and third transformer windings being magnetically relatively tightly coupled to each other, said alternating input voltage source being coupled to said transformer first winding, said load circuit being coupled to said transformer third winding, said winding located on said magnetizable core being coupled to said transformer second winding for developing said regulated alternating polarity output voltage across said transformer second winding.

3. A system according to claim 2 wherein the amplitude of the voltage developed across said transformer second winding increases when said winding located on said magnetizable core is disconnected from said transformer second winding.

4. A system according to claim 3 wherein said load circuit includes an ultor terminal and a high voltage rectifying arrangement coupled to said transformer third winding for developing a DC ultor voltage at said ultor terminal.

5. A system according to claim 4 including a deflection winding, a deflection generator coupled thereto and energized by a B+ scanning voltage for developing scanning current in said deflection winding and means responsive to said regulating alternating polarity output voltage for developing therefrom said B+ scanning voltage.

6. A system according to claims 1, 2, 3 or 4 wherein said detecting means includes another winding located on said magnetizable core, a fault signal being developed across said other winding only in the presence of a fault operating condition.

7. A system according to claim 6 wherein said controllable source of alternating input voltage comprises a source of DC voltage, an oscillator including a control circuit and output switching means coupled to said source of DC voltage and having a control terminal coupled to said control circuit for developing said alternating input voltage from said DC voltage, the frequency of said alternating input voltage being determined by the frequency of operation of said oscillator.

8. A system according to claim 7 wherein said means for changing the frequency of operation of said source of alternating input voltage includes a reactive network and means for coupling said reactive network in circuit with said oscillator control circuit only in response to said fault signal to change the frequency of operation of said oscillator to one that results in the disruption of the operation of said ferroresonant power supply.

9. A system according to claim 8 wherein the frequency of operation of said oscillator during a fault operating condition is changed to one that is too high to sustain ferroresonant operation.

10. A system according to claim 9 wherein the frequency of operation of said oscillator during a fault operating condition is around 100 kilohertz or higher.

11. A system according to claim 8 including a horizontal deflection winding and a horizontal deflection generator coupled thereto for developing horizontal deflection current in said deflection winding, wherein said control circuit includes means coupled to said horizontal deflection generator for synchronizing operation of said oscillator with horizontal deflection.

12. A television display system that includes a ferroresonant power supply with a protection circuit for disabling normal operation of a load circuit within said television display system during a fault operating condition, comprising:
   a source of direct voltage;

an oscillator including output switching means coupled to said direct voltage source for developing at an output of said oscillator an alternating supply voltage having a frequency that is related to the frequency of operation of said oscillator, said oscillator including first control means for producing oscillator operation at a first frequency;

a magnetizable core including a saturable core section;

a winding located on said core;

means responsive to said alternating supply voltage for developing an exciting current that generates a magnetic flux in said magnetizable core that links said winding to produce an alternating polarity output voltage;

a capacitance associated with said winding for aiding in the magnetic saturation of said saturable core section during each cycle of said alternating polarity output voltage to regulate said output voltage by ferroresonant operation;

a load circuit within said television display system that is energized by said regulated alternating polarity output voltage;

means for generating a fault detection signal during the occurrence of a fault operating condition within said television display system; and auxiliary control means coupled to said oscillator and activated by said fault detection signal for changing the frequency of operation of said oscillator to a second one that produces a disruption of the operation of said ferroresonant power supply by means of the inability of said power supply to remain in ferroresonance in order to disable operation of said television display system load circuit.

13. A system according to claim 12 wherein said auxiliary control means includes a reactive network and means for coupling said reactive network in circuit with said first control means only in response to the generation of said fault detection signal.

14. A system according to claim 13 wherein said second frequency of oscillator operation is one that is too high to sustain ferroresonant operation.

15. A system according to claim 14 wherein said first control means includes means responsive to a horizontal deflection rate signal developed within said television display system for establishing said first frequency as the horizontal deflection frequency.

16. A system according to claim 15 wherein said second frequency of oscillator operation is around 100 kilohertz or higher.

17. A system according to claims 15 or 16 wherein during start-up operation of said ferroresonant power supply in the absence of said horizontal deflection rate signal said first control means produces oscillator operation at a third frequency that is lower than the horizontal deflection frequency.

18. A system according to claim 17 wherein said third frequency of oscillator operation is between 5 and 10 kilohertz.

19. A system according to claim 14 wherein said exciting current development means comprises a transformer having first, second and third windings, said second and third transformer windings being magnetically relatively tightly coupled to each other, said alternating supply voltage source being applied to said transformer first winding, said load circuit being coupled to said transformer third winding, said winding located on said magnetizable core being coupled to said transformer second winding for developing said regulated alternating polarity output voltage across said transformer second winding.

20. A system according to claim 19 wherein the amplitude of the voltage developed across said transformer second winding increases when said winding located on said magnetizable core is disconnected from said transformer second winding.

21. A system according to claim 20 wherein said fault detecting signal generating means includes another winding located on said magnetizable core, said fault detection signal being developed across said other winding only in the presence of a fault operating condition.

22. A system according to claim 20 wherein said load circuit includes an ultor terminal and a high voltage rectifying arrangement coupled to said transformer third winding for developing a DC ultor voltage at said ultor terminal.

23. A system according to claim 22 including a deflection winding, a deflection generator coupled thereto an energized by a B+ scanning voltage for developing scanning current in said deflection winding and means responsive to said regulating alternating polarity output voltage for developing therefrom said B+ scanning voltage.

* * * * *

UNITED STATES PATENT AND TRADEMARK OFFICE
CERTIFICATE OF CORRECTION

PATENT NO. : 4,377,775

DATED : March 22, 1983

INVENTOR(S) : Donald Henry Willis

It is certified that error appears in the above-identified patent and that said Letters Patent is hereby corrected as shown below:

Column 5, line 38, "78" should read -- 87 --.

Column 10, line 43, "an" should read -- and --.

Signed and Sealed this

Thirtieth Day of August 1983

[SEAL]

Attest:

Attesting Officer

GERALD J. MOSSINGHOFF

Commissioner of Patents and Trademarks